United States Patent [19]
Shibata

[11] Patent Number: 5,661,276
[45] Date of Patent: Aug. 26, 1997

[54] AUTOMOBILE LEVER SWITCH HAVING A PLATE SPRING WITH MOVABLE CONTACT POINTS AND MULTIPLE HOLDING FINGERS

[75] Inventor: Takeshi Shibata, Tokyo, Japan

[73] Assignee: Niles Parts Co., Ltd., Japan

[21] Appl. No.: 628,321

[22] Filed: Apr. 5, 1996

[30] Foreign Application Priority Data

Apr. 11, 1995 [JP] Japan .................................. 7-110063

[51] Int. Cl.$^6$ .............................. H01H 3/16; H01H 9/00
[52] U.S. Cl. .............................. 200/61.54; 200/61.27
[58] Field of Search .................... 200/61.54, 61.27, 200/61.31, 61.34, 61.35, 4; 307/10.1, 10.4

[56] References Cited

U.S. PATENT DOCUMENTS

| | | | |
|---|---|---|---|
| 4,088,858 | 5/1978 | Kramer | 200/61.27 |
| 4,315,117 | 2/1982 | Kokubu et al. | 200/61.27 |
| 4,328,431 | 5/1982 | Usami | 307/10 R |
| 4,599,500 | 7/1986 | Wilcox | 200/61.54 |
| 5,107,243 | 4/1992 | Maeda | 338/172 |

OTHER PUBLICATIONS

Japanese Utility Model Gazette No. SHO63-23254, and English translation pp. 1-2 Jun. 24, 1988.

*Primary Examiner*—Adolf Berhane
*Attorney, Agent, or Firm*—Ronald P. Kananen

[57] ABSTRACT

An automobile lever switch having a lever 1 installed in a manner so as to be freely rotatable in upward and downward directions. A plate spring 10 is activated by the upward and downward rotational operation of the lever 1. The plate spring 10 makes contact with stationary contact plates 14 on a terminal plate 9. The plate spring 10 has movable contact points 10b, 10c that make contact with the stationary contact plates 14 at one end, and multiple holding fingers 10e, 10f that make contact with the stationary contact plates 14 are formed at the other end. By forming holding fingers in a plate spring, the plate spring can be easily installed on the stationary contact plates by a single touch.

15 Claims, 3 Drawing Sheets

AUTOMOBILE LEVER SWITCH HAVING A PLATE SPRING WITH MOVABLE CONTACT POINTS AND MULTIPLE HOLDING FINGERS

BACKGROUND OF THE INVENTION

1. Field of the Invention

The present invention relates to switches for automobiles and, in particular, to an automobile lever switch that controls/operates a wiper system of an automobile.

2. Description of the Related Art

An example of a conventional wiper switch for an automobile is explained in Japanese Utility Model No. 63-23254. With this automobile wiper switch, when an operating lever is turned to a mist-operating mode, a push rod presses a plate spring to make contact with a stationary contact point so that the wiper system is turned to the "ON" state. One end of the plate spring is fixed by being tightly screwed to a stationary member.

However, in the conventional wiper switch assembly described above, since a plate spring is fixed by being screwed to a stationary member, the manufacturing process of the switch assembly is difficult and the number of component items is large, causing higher cost.

SUMMARY OF THE INVENTION

An object of the present invention is to solve the problems associated with the aforementioned conventional switch assembly.

In order to solve the above-mentioned problems, the present invention has an object to provide a switch assembly that enables a simple installation of a plate spring on a terminal plate by a single touch.

A further object of the present invention is to reduce the number of component parts in the wiper switch assembly.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In order to achieve the object of the present invention, there is provided in an automobile lever switch having a lever that is freely rotatable in upward and downward directions and a plate spring that is activated by the upward and downward rotational operation of the lever and contacts stationary contact plates on a terminal plate, movable contact points that contact the stationary contact plates, the movable contact points being formed at one end of the plate spring, and multiple resilient holding fingers that contact the stationary contact plates, the multiple holding fingers being formed on the other end of the plate spring.

In the automobile lever switch of the present invention, stationary contact plates preferably have an installation part for installation of the holding fingers, and a terminal plate has holes for insertion of the holding fingers in the vicinity of the installation part of the stationary contact plate.

The terminal plate preferably has supporting projections at both sides of the holding fingers of the plate spring. The holding fingers of the plate spring preferably have fall-off prevention claws that are latched onto the side surface of the installation part of the stationary contact plate. The terminal plate preferably has a supporting part in the vicinity of the holes that contacts the lower surface of the plate spring.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE PREFERRED EMBODIMENT

Figure 1:
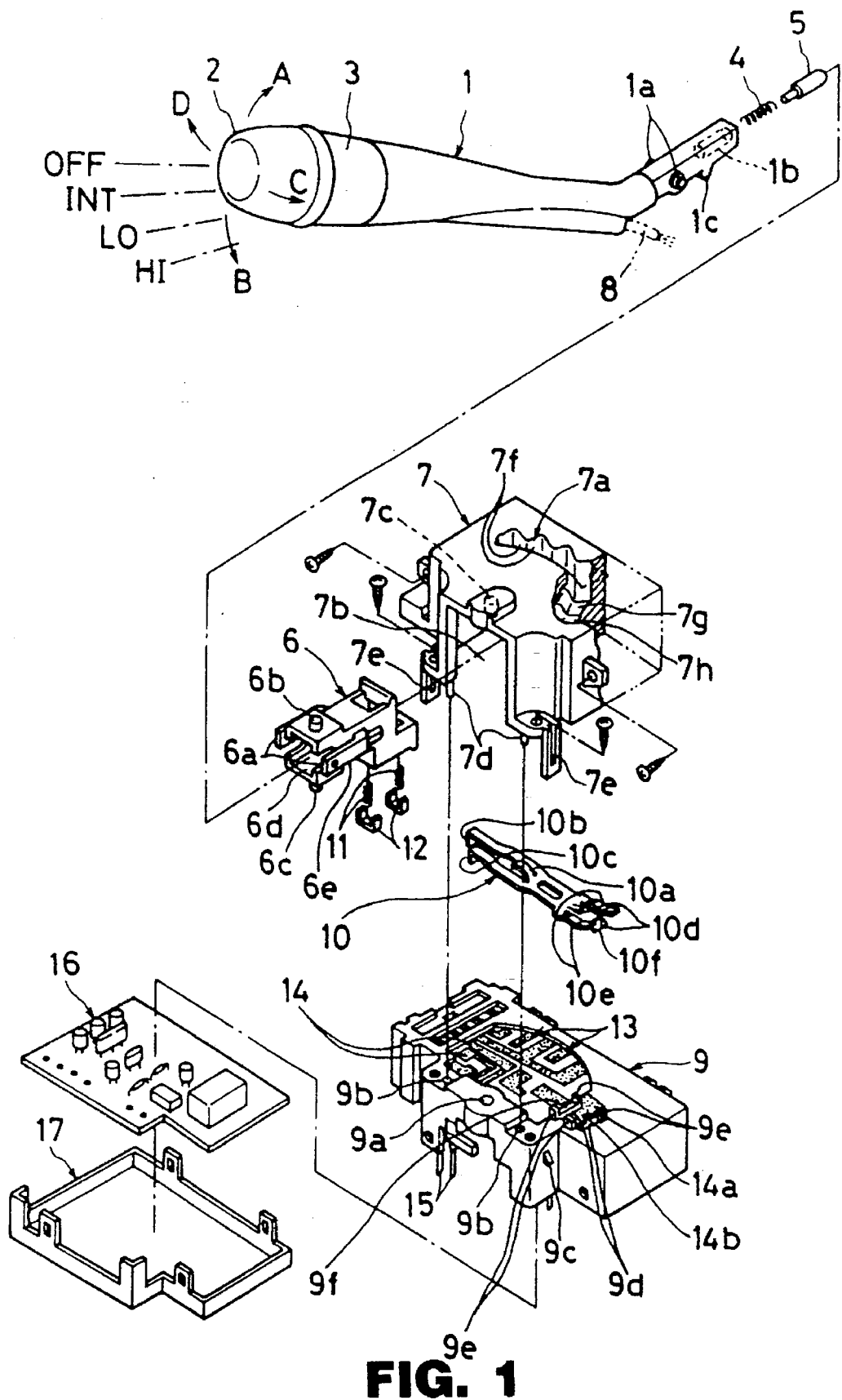
FIG. 1 is an oblique diagram showing an exploded view of an application example of the present invention.
Figure 2:
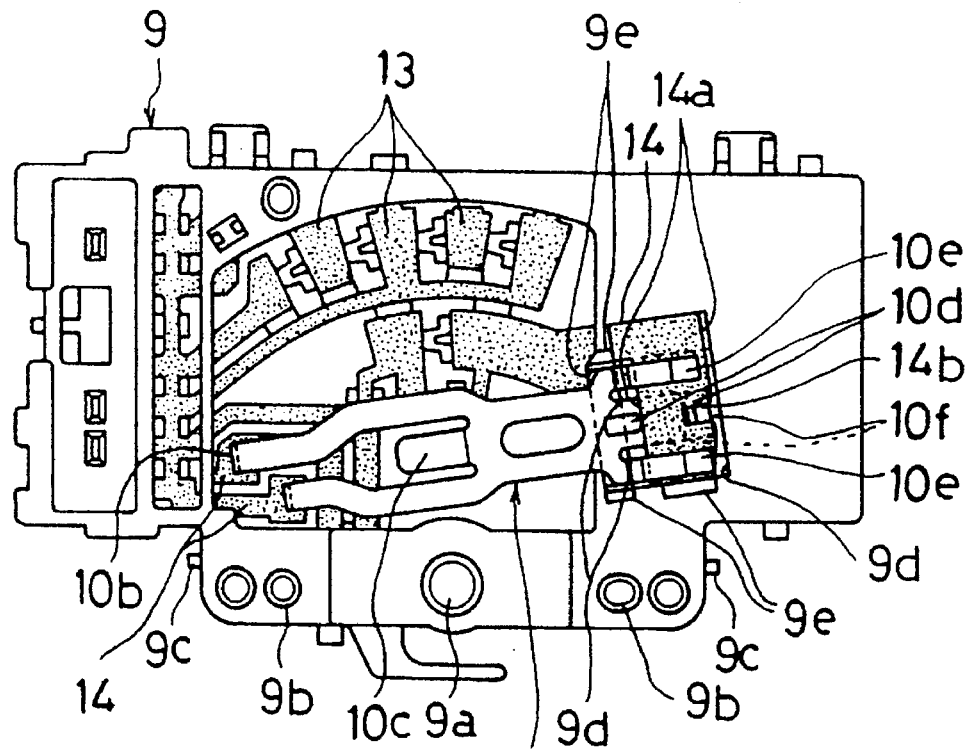
FIG. 2 is a diagram showing an application example of the present invention and providing an enlarged view of a terminal plate.

A preferred embodiment of the present invention will be described in detail hereinafter with reference to FIGS. 1 to 4 of the accompanying drawings.

A lever 1 of a wiper switch is installed on a base that is fixed on an automobile steering column (not shown). An application example of the present invention is explained by considering the lever 1 as an operating component of an automobile wiper switch. The lever 1 can also be used as an operating component of other types of switches.

A blind hole 1b for insertion of a detent 5 via a spring 4 is prepared at one end of the lever 1, and an intermittent wiper control switch 2 and rear wiper washer switch 3 consisting of a rotary switch are placed at the other end of the lever 1.

The lever 1 rotates upward or downward around the axis 1a as indicated by arrow signs A, B. When the lever 1 is turned upward as indicated by the arrow sign A to the first stage operation, the system is in a mist-operation mode. When the lever 1 is turned upward as indicated by the arrow sign A further to the second stage operation, the system is in a wiper washer-operation mode. The lever 1 is connected to the intermittent wiper control switch 2 and the rear wiper washer switch 3, and the axis 1a is axially supported on the axis support pieces 6a formed in both side surfaces of the movable body 6.

The lever 1 can also be used as an operating component of a turn-signal switch, a passing switch, and a dimmer switch. Instead of using an intermittent wiper control switch 2, for example, a front light switch can be used. And, instead of using a rear wiper washing switch 3, for example, a fog lamp switch can be used.

The movable body 6 is inserted into the opening part 7b formed on the side surface of the case 7. In the movable body 6, projected supporting axes 6b, 6c are formed respectively on the surface above and on the surface below. Together with the lever 1, the movable body 6 can be rotated to the left or to the right as indicated by the arrow signs C, D around the supporting axes 6b, 6c. In the movable body 6, the supporting axis 6b is fitted into the axis hole 7c prepared on the upper surface of the opening part 7b, while the supporting axis 6c is fitted into the axis hole 9a on the terminal plate 9. The movable contact plates 12 are latched onto the lower surface of the movable body 6 at the side of the detent cam surface 7a via springs 11.

Figure 3:
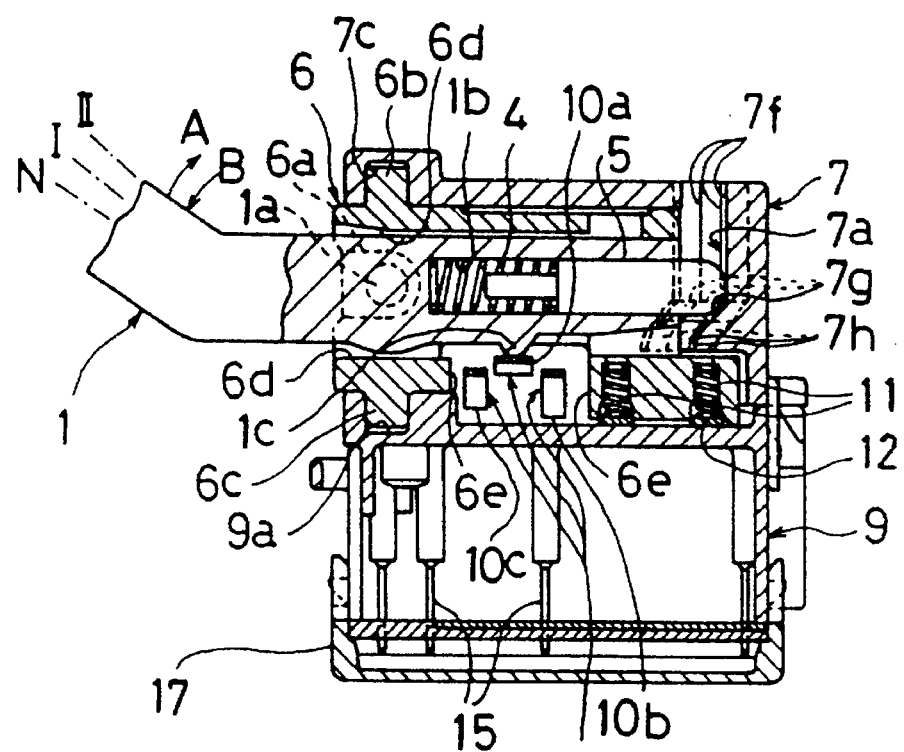
FIG. 3 is a diagram showing an application example of the present invention and providing an enlarged cross-sectional view of one section.

As shown in FIG. 3, the plate spring 10 is installed in the space 6e formed at the lower center of the movable body 6. The installation space 6e for installing the plate spring 10 is made of a vertical hole connected to the axis hole 6d of the movable body 6. The pressing part 1c of the lever 1 contacts by pressing the operating part 10a of the plate spring 10.

The case 7 is fitted onto a switch base (not shown) that is screwed onto a steering column. Protruded rods 7d, which are protruded from the lower surface of the case 7, are fitted into blind holes 9b, latching pieces 7e formed at the periphery of the case 7 are engaged with claws 9c, and the case 7 is screwed onto the terminal plate 9.

The detent cam surfaces 7a are for supporting the lever 1 of the wiper switch at a wiper stop position OFF, a wiper intermittent operating position INT, a wiper low speed operating position LO, a wiper high speed operating position HI, a mist operating position I, and a wiper washer operating position II. The detent cam surfaces 7a are formed at the back wall of the opening part 7b. In each detent cam surface 7a, a vertical surface 7f, a first sloped surface 7g for a mist operation, and a second sloped surface 7h for wiper washer operation are formed. As shown in FIG. 1, the circular arc-shaped detent cam surface 7a is a ditch continuously formed in a generally vertical direction.

The vertical surface 7f is a surface for holding the switch in a mist OFF state as the lever 1 is rotated completely to the direction indicated by the arrow sign B when the detent 5 makes contact with the vertical surface 7f by pressing. The vertical surface 7f is vertically formed at the upper part of each detent cam surface 7a at the back wall of the opening part 7b.

The first sloped surface 7g gives a moderated feeling as the detent 5 contacts the first sloped surface 7g when the lever 1 is rotated to the direction indicated by the arrow sign A for the first stage operation, and makes the lever 1 automatically return to the OFF position N. The first stage operating position at which the detent 5 contacts the first sloped surface 7g is the mist operating position I at which the wiper performs a mist operation (i.e., a one-time operation). The first sloped surface 7g is continuously prepared at a lower part of each vertical surface 7f of the detent cam surface 7a.

The second sloped surface 7h is a sloped surface continuously prepared at a part of the detent cam surface 7a lower than that of the first sloped surface 7g. The tilt angle of the second sloped surface 7h is smaller than that of the first sloped surface 7g. The second sloped surface 7h gives a moderated feeling as the detent 5 contacts the second sloped surface 7h when the lever 1 is rotated to the direction indicated by the arrow sign A for the second stage operation, and makes the lever 1 automatically return to the OFF position N. The second stage operating position at which the detent 5 contacts the second sloped surface 7h is the wiper washer operating position II at which both the wiper and the washer are operated simultaneously.

The terminal plate 9 is formed by inserting stationary contact plates 13, stationary contact plates 14, and terminals 15. The movable contact plates 12 installed underneath the movable body 6 make contact with the stationary contact plates 13. The movable contact point 10b for mist operation and the movable point 10c for wiper washer operation on the plate spring 10 make contact with the stationary contact plates 14. A cover 17 is installed on the terminal plate 9 via a substrate 16.

Figure 4:
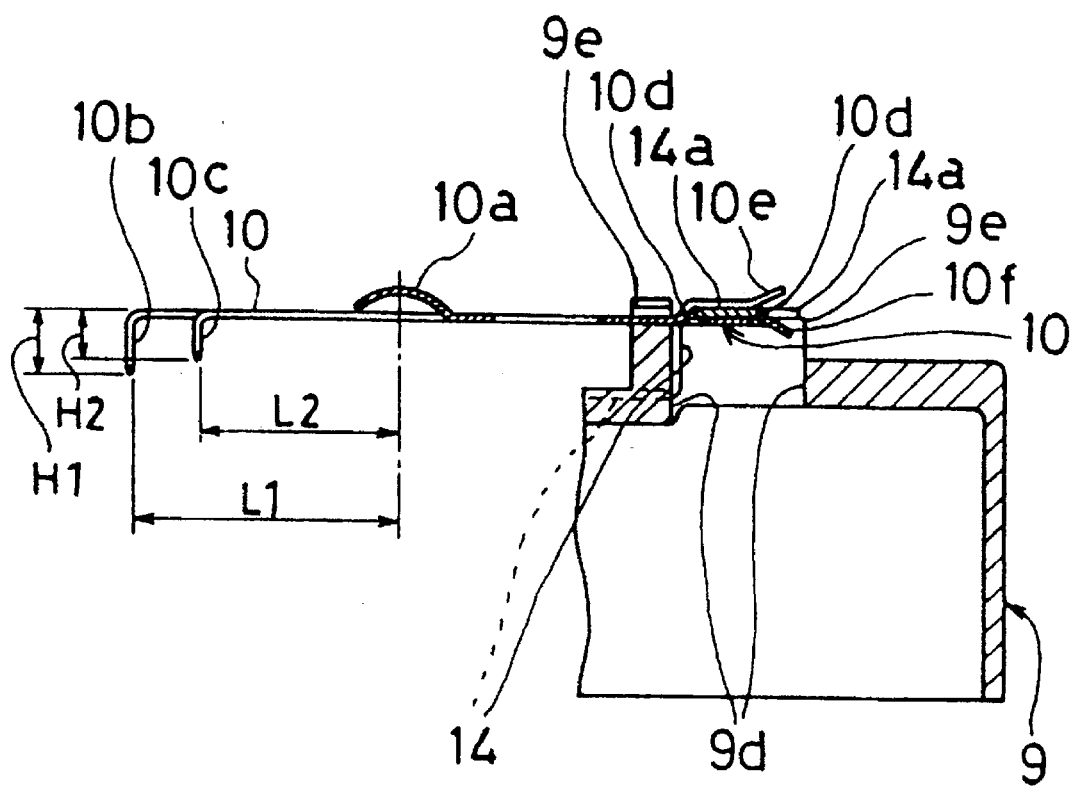
FIG. 4 is a diagram showing an application example of the present invention and providing an enlarged side view of a cross-section showing an assembly of a plate spring.

Reference numeral 9d indicates rectangular holes bored on the terminal plate 9, as shown in FIG. 4. An installation part 14a of the stationary contact plate 14 is placed at the location above the holes 9d. The resilient holding fingers 10e, 10f of the plate spring 10 are pushed into the installation part 14a of the stationary contact plate 14.

Reference numeral 9e indicates supporting projections to which the holding fingers 10e of the plate spring 10 are fitted. The plate spring 10 is prevented from moving horizontally by these supporting projections 9e. These supporting projections 9e are made of multiple projections set at both sides of a holding finger 10e.

Reference numeral 9f indicates a supporting part placed between the supporting projections 9e at the right-hand side and at the left-hand side. The supporting part 9f contacts a lower surface of the plate spring 10. The supporting part 9f is protruded from the upper surface of the terminal plate 9 to a desired height so that, when the lever 1 is at the OFF position N, the movable contact point 10b for the mist operation and the movable contact point 10c for the wiper washer operation can be held at a specified height from the stationary contact plate 14.

The operating part 10a, the movable contact point 10b for the mist operation, and the movable contact point 10c for the wiper washer operation are formed into a three-way branch form at one end part of the plate spring 10. And, holding fingers 10e, 10f, which are to be pressed into the installation part 14a of the stationary contact plate 14, are formed into a three-way branch form at the other end part of the plate spring 10. The plate spring 10, made of metal conductive materials, is fixed on the stationary contact plates 14 in a simple manner (i.e., by a single touch) by inserting holding fingers 10e, 10f into the installation part 14a so that the plate spring 10 and the stationary contact plates 14 can be electrically connected. With the holding fingers 10f, the plate spring 10 is prevented from falling-off from the installation part 14a by latching the two fall-off prevention claws 10d formed at two opposing positions onto the side surface of the installation part 14a and the notch 14b.

The curved operating part 10a is located on the line extended from the movable contact point 10b for the mist operation and the movable contact point 10c for the wiper washer operation. The pressing part 1c contacts this operating part 10a. Alternatively, a push rod can be placed between the operating part 10a and the lever 1 so that the operating part 10a can be activated via the push rod.

As shown in FIG. 4, the movable contact point 10b for the mist operation is protruded for a length of L1 in the horizontal direction from the operating part 10a, and is bent downward forming a L-shape for a length of H1. The movable contact point 10c for the wiper washer operation is protruded for a length of L2 in the horizontal direction from the operating part 10a, and is bent downward forming an L-shape for a length of H2.

The fall-off prevention claws 10d, made of two claw-shaped tongue pieces, are formed on the holding finger 10f at two opposing positions facing upward. The plate spring 10 is fixed on the terminal plate 9 by latching these two fall-off prevention claws 10d onto both side surfaces of the installation part 14a. The holding fingers 10e consist of two projected pieces formed at both sides of the holding finger 10f. Tips of the holding fingers 10e are bent upward so that they can be easily pushed into the installation part 14a. When the holding fingers 10e are installed in the installation part 14a, they are installed on the upper side of the installation part 14a.

The holding finger 10f is a projected piece installed between the two holding fingers 10e, forming the aforementioned two fall-off prevention claws 10d. A tip of the holding finger 10f is bent downward. When the holding finger 10f is installed in the installation part 14a, it is installed on the lower side of the installation part 14a.

In the aforementioned plate spring 10, the three-way branches, including the movable contact points 10b, 10c and the operating part 10a, can be made into an integrated plate. In other words, in the plate spring 10, the moveable contact points 10b, 10a can be made into an integrated plate, eliminating the operating part 10a. Furthermore, the usage of the plate spring 10 is not limited to wiper controls. For instance, the plate spring 10 can be used as a contact point component of a passing switch or a dimmer switch.

The upper edges of the stationary contact plates 13, 14 are exposed from the terminal plate 9, and the lower edges are either integrated with or welded onto the terminals 15. As shown in FIG. 3, these terminals 15 are soldered onto through holes of a substrate 16. The substrate 16 is placed between the terminal plate 9 and the cover 17. The cover 17 is latched onto the terminal plate 9.

The automobile lever switch of the present invention has a constitution as explained thus far. The operation of the automobile lever switch will be explained next by referring to FIGS. 1 to 4.

To install the plate spring 10 on the terminal plate 9, the holding finger 10f of the plate spring 10 is inserted into a hole 9d on the terminal plate 9. Two holding fingers 10e are placed on the upper surface of the installation part 14a of the stationary contact plate 14. Thus, the plate spring 10 is supported on the installation part 14a by the elastic force exerted by the holding fingers 10e and the holding finger 10f, and an electric connection is made.

Furthermore, in the plate spring 10, the fall-off prevention claw 10d is engaged with the notch 14b, two fall-off prevention claws 10d are latched onto the side surface of the installation part 14a so that the plate spring 10 is prevented from falling off from the installation part 14a. The plate spring 10 is installed in the installation part 14a. Both sides of a holding finger 10e are contacted with supporting projections 9e so that the plate spring 10 is prevented from moving in a horizontal direction. As the lower surface of the plate spring 10 contacts the supporting part 9f, the movable contact points 10b, 10c can be held at a desired height.

When the lever 1 is at the OFF position N, the state of the switch is shown in FIGS. 3 and 4. The detent 5 is pressed onto the vertical surface 7f of the detent cam surface 7a. The plate spring 10 will not be bent at the pressing part 1c. The movable contact point 10b for the mist operation and the movable contact point 10c for the wiper washer are not contacting the stationary contact plates 14.

When the lever 1 at this OFF position N is put into the first stage operation through a rotation in the upward direction indicated by the arrow sign A, the lever 1 is rotated around the shaft rod 1a to the mist operating position I. The tip of the detent 5 slides from the vertical surface 7f, through the first sloped surface 7g, and then to the border between the first sloped surface 7g and the second sloped surface 7h. During this process, the detent 5 presses the spring 4, and slightly enters into the blind hole 1b, giving a moderated feeling of the first stage operation. In the plate spring 10, the operating part 10a is pressed by the pressing part 1c causing the movable contact point 10b for the mist operation to contact the stationary contact plate 14. As a result, the mist operation is turned to the ON state, at which the wiper is operated once. At this time, although the movable contact point 10c for the wiper washer operation is lowered slightly, it still does not contact the stationary contact plates 14.

When the lever 1 at this mist operating position I is put into the second stage operation through a rotation in the upward direction indicated by the arrow sign A, the lever 1 is rotated around the shaft rod 1a to the wiper washer operating position II. The tip of the detent 5 slides from the border between the first sloped surface 7g and the second sloped surface 7h to the second sloped surface 7h. During this process, the detent 5 presses the spring 4, and enters farther into the blind hole 1b, giving a moderated feeling of the second stage operation. In the plate spring 10, the operating part 10a is pressed by the pressing part 1c causing the movable contact point 10c for the wiper washer operation to contact the stationary contact plates 14. As a result, the wiper washer operation is turned to the ON state, at which the wiper and washer are operated simultaneously.

When the hand is taken off from the lever 1 at the aforementioned first stage mist operating position I or at the second stage wiper washer operating position II, the detent 5, which is energized by the spring 4, slides through the second sloped surface 7h in the case when the lever 1 is at the position II and the first sloped surface 7g and moves to the vertical surface 7f. The lever rotates in the direction as indicated by the arrow sign B, and automatically returns to the original OFF position N.

When the lever 1 is rotated in the direction indicated by the arrow sign D so that the detent 5 is engaged to the detent cam surface 7a, the wiper switch is at the wiper stop position OFF. When the lever 1 at this wiper stop position OFF is put into a one-stage operation through a rotation in the direction indicated by the arrow sign C, the lever 1 is set to the wiper intermittent operation position INT. When the lever 1 is at the wiper intermittent position INT, the intermittent time of the wiper can be adjusted by rotating the intermittent wiper control switch 2.

When the lever 1 is put further into a one-stage operation through a rotation in the direction indicated by the arrow sign C, the lever 1 is set to the wiper low-speed operating position LO, at which the wiper is operated at low speed. When the lever 1 is put even further into a one-stage operation through a rotation in the same direction, the lever 1 is set at the wiper high-speed operating position HI, at which the wiper is operated at high speed.

Because of the above-described constitution of the lever switch according to the present invention, the present invention has the following effects:

1) In an automobile lever switch having a lever that is freely rotatable in upward and downward directions and a plate spring that is activated by the upward and downward rotational operation of the lever and contacts stationary contact plates on a terminal plate, movable contact points that contact the stationary contact plates are formed at one end of the plate spring, and multiple holding fingers that contact the stationary contact plates are formed on the other end of the plate spring. Thus, a plate spring can be easily installed by a single touch on a terminal plate, and the number of assembly steps and component items can be reduced.

2) In the automobile lever switch of the present invention, stationary contact plates have an installation part for installation of the holding fingers, and a terminal plate has holes for insertion of the holding fingers in the vicinity of the installation part of the stationary contact. Thus, the holding fingers can be inserted into the holes from the upper surface of the terminal plate to hold the stationary contact plate, and the plate spring can be easily installed on the stationary contact plate.

3) In the automobile lever switch of the present invention, the terminal plate has supporting projections at both sides of the holding fingers of the plate spring. Thus, the plate spring latched onto the stationary contact plate can be prevented from falling off caused by impacting or by vibration.

4) In the automobile lever switch of the present invention, the holding fingers of the plate spring have fall-off prevention claws that are latched onto the side surface of the installation part of the stationary contact plate. Thus, the plate spring latched onto the stationary contact plate can be prevented from falling off, and the impact resistance and vibration resistance of the plate can be improved.

5) In the automobile lever switch of the present invention, the terminal plate has a supporting part in the vicinity of the holes that contacts the lower surface of the plate spring. Thus, the movable contact points can be held at a desired height from the stationary contact plate so that the contact between the movable contact points and the stationary contact plate can be stabilized.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

I claim:

1. In an automobile lever switch having a lever that is freely rotatable in upward and downward directions and a conductive plate spring that is activated by upward and downward rotational operation of the lever and contacts stationary contact plates on a conductive terminal plate,
   a plurality of movable contact points that electrically contact said stationary contact plates are formed at one end of said plate spring, and multiple holding fingers that electrically contact said stationary contact plates are formed on the other end of said plate spring.

2. In the automobile lever switch described in claim 1, wherein said stationary contact plates have an installation part for installation of said holding fingers,
   said terminal plate has holes for insertion of said holding fingers in the vicinity of said installation part of the stationary contact plate.

3. In the automobile lever switch described in claim 1, wherein said terminal plate has supporting projections at both sides of the holding fingers of the plate spring.

4. In the automobile lever switch described in claim 1, wherein said holding fingers of the plate spring have fall-off prevention claws that are latched onto the side surface of said installation part of the stationary contact plate.

5. In the automobile lever switch described in claim 2, wherein said terminal plate has a supporting part in the vicinity of said holes that contacts the lower surface of the plate spring.

6. An automobile lever switch, comprising:
   a lever that is freely rotatable in upward and downward directions;
   a plate spring that is activated by upward and downward operation of the lever to selectively contact a plurality of stationary contact plates on a terminal plate;
   said plate spring having first and second ends, movable contact points that contact said stationary contact plates being formed at said first end of said plate spring, and means for securing said plate spring to said terminal plate being formed at said second end, said securing means comprising multiple resilient holding fingers that contact and grasp an installation part of said terminal plate.

7. The automobile lever switch according to claim 6, wherein said terminal plate has holes for receiving said holding fingers adjacent said installation part.

8. In the automobile lever switch described in claim 7, wherein said terminal plate has a supporting part adjacent said holes that contacts the lower surface of the plate spring to hold the movable contact points at a desired height.

9. The automobile lever switch according to claim 6, wherein said terminal plate has supporting projections at both sides of the holding fingers of the plate spring to prevent said plate spring from moving in a horizontal direction.

10. The automobile lever switch according to claim 6, wherein said holding fingers of the plate spring have fall-off prevention claws that are latched onto the side surface of said installation part of the terminal plate to prevent said plate spring from falling off from the installation part.

11. An automobile lever switch, comprising:
    a lever that is rotatably mounted to a base for rotation about an axis;
    a terminal plate having first and second stationary contact plates and an installation part; and
    a plate spring that extends cantileverly from said installation part of said terminal plate and is engaged by a pressing part of the lever upon rotation of said lever to selectively contact said plate spring with said first and second stationary contact plates, a first end of said plate spring having first and second movable contact points that selectively contact said first and second stationary contact plates, respectively, a distance (H1) between said first movable contact point and said first stationary contact plate being greater than a distance (H2) between said second movable contact point and said second stationary contact plate before rotation of said lever, whereby said first movable contact point contacts said first stationary contact plate before said second movable contact point contacts said second stationary contact plate upon rotation of said lever to press said plate spring.

12. The automobile lever switch according to claim 11, wherein a second end of said plate spring has a plurality of resilient holding fingers that contact and grasp said installation part of said terminal plate.

13. The automobile lever switch according to claim 11, Wherein said plate spring has an operating part positioned between said first and second movable contact points, said operating part being engaged and pressed by said pressing part of said lever upon rotation of said lever.

14. The automobile lever switch according to claim 11, wherein engagement of said first movable contact point to said first stationary contact plate provides a mist-operation mode, and engagement of said second movable contact point to said second stationary contact plate provides a wiper washer-operation mode.

15. The automobile lever switch according to claim 11, wherein said first and second movable contact points of said plate spring each comprises an end portion that is downwardly bent in an L-shape at said first end of said plate spring, said downwardly bent end portion of said first movable contact point having a greater length than said downwardly bent end portion of said second movable contact point.

* * * * *